(12) United States Patent
Arnold

(10) Patent No.: US 6,731,253 B1
(45) Date of Patent: May 4, 2004

(54) AMBIENT ADAPTABLE OPTICAL COMBINER

(75) Inventor: Victor C. Arnold, Elk River, MN (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 09/368,658

(22) Filed: Aug. 5, 1999

(51) Int. Cl.7 .................................................. G09G 5/00
(52) U.S. Cl. .......................................................... 345/8
(58) Field of Search ...................... 345/7, 8, 9; 359/630, 359/13, 11, 618

(56) References Cited

U.S. PATENT DOCUMENTS

| | | | | |
|---|---|---|---|---|
| 4,968,127 A | * | 11/1990 | Russell et al. | 351/158 |
| 5,005,009 A | * | 4/1991 | Roberts | 345/7 |
| 5,313,292 A | * | 5/1994 | Wood et al. | 359/13 |
| 5,576,886 A | * | 11/1996 | Ferrante | 359/630 |
| 5,601,352 A | * | 2/1997 | Okamura | 349/112 |
| 5,892,598 A | * | 4/1999 | Asakawa et al. | 345/7 |
| 6,008,946 A | * | 12/1999 | Knowles | 359/630 |
| 6,292,158 B1 | * | 9/2001 | Amafuji et al. | 345/7 |
| 6,356,437 B1 | * | 3/2002 | Mitchell et al. | 361/683 |

FOREIGN PATENT DOCUMENTS

JP   10-221635   * 8/1998

* cited by examiner

*Primary Examiner*—Chanh Nguyen
(74) *Attorney, Agent, or Firm*—McDonnell Boehnen Hulbert & Berghoff LLP

(57) ABSTRACT

A helmet apparatus to improve viewing of a display image as well as an external scene includes a combiner placed over one eye of the user. The combiner is coated with a material which attenuates light to provide a contrast between the combiner and ambient light conditions.

6 Claims, 4 Drawing Sheets

AMBIENT ADAPTABLE OPTICAL COMBINER

The Government has rights in this invention pursuant to Contract No. DAAJ09-95-D-0024, awarded by the Department of the Army.

BACKGROUND OF THE INVENTION

Helmet mounted displays allow for the simultaneous viewing of visual information and/or images generated by a computer or other source, together with and/or superimposed on a direct viewing of an external scene. Such helmet mounted displays are used in many areas including training, entertainment and military applications such as aircraft pilots. Aircraft pilots find such displays useful in furnishing information relating to aircraft operation, weather radar presentations, maps, weapons aiming, and other such information as would be useful or desirable while flying.

In some displays, the visual information or visual images are superimposed on an optical combiner mounted on the head gear, a helmet visor for example, in view of the eye of the wearer such as the observer's line of sight. In helmet mounted displays, in order for a display image to be viewed by the user's eye, sufficient contrast against the background scene must exist to allow the image to be clearly viewed. For example, during the daytime, it would be difficult for an observer to view a display image as well as the external scene due to the brightness of daytime.

To assure that the contrast is provided in high ambient conditions, the display image must either be of high luminance or the background luminance must be attenuated. However, capabilities to provide a good contrast have resulted in high cost, high energy use or complex configurations. It would be desirable to have a simple, low cost implementation to provide a great contrast in helmet displays that requires little energy. Further, it would be desirable to have an implementation in which the helmet user could control the contrast.

SUMMARY OF THE INVENTION

A helmet apparatus to improve viewing of a display image as well as an external scene includes a combiner placed over one eye of the user. The combiner is coated with a material which attenuates light to provide a contrast between the combiner and ambient light conditions. The apparatus automatically attenuates the combiner when ambient light is sensed by a light sensor. The combiner will attenuate more if the ambient light is greater. The combiner attenuation may also be controlled manually based on the user's desire.

DETAILED DESCRIPTION OF THE PRESENT INVENTION

Figure 1:
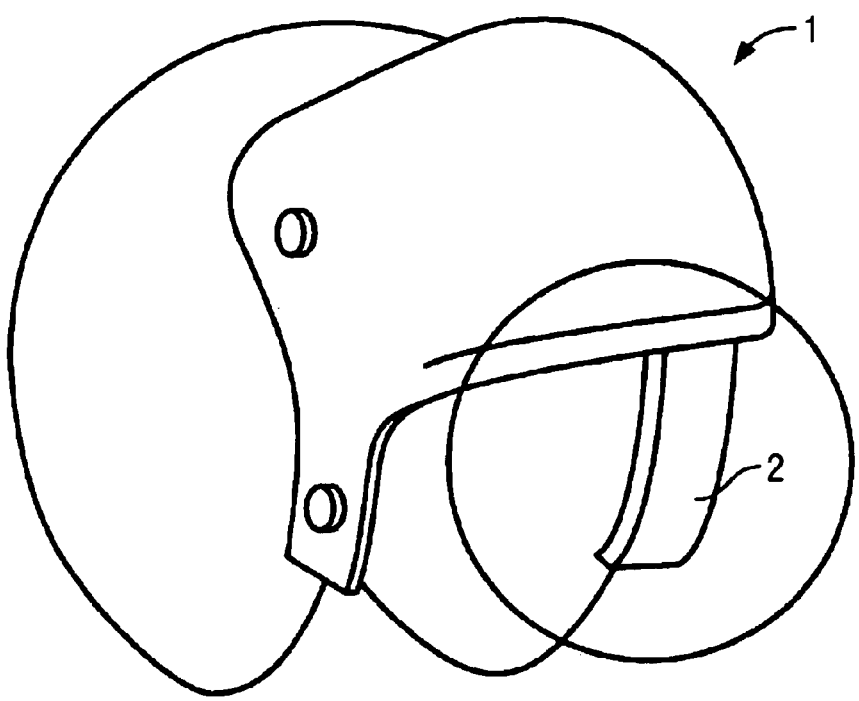
FIG. 1 shows combiner of the invention attached to a helmet.

The present invention uses a combiner 2 of a helmet mounted display that acts as a variable density optical filter. Combiners 2 are well known in this area of technology routinely used with see-through helmet mounted displays. FIG. 1 shows the combiner 2 attached to a helmet 1. The combiner 2 is only placed over one eye. The combiner 2 darkens or attenuates transmission for bright background ambient light conditions. The level of attenuation is controlled automatically by a small optical light sensor 4 on the front part of the helmet 1 which senses the background ambient illumination.

Figure 2:
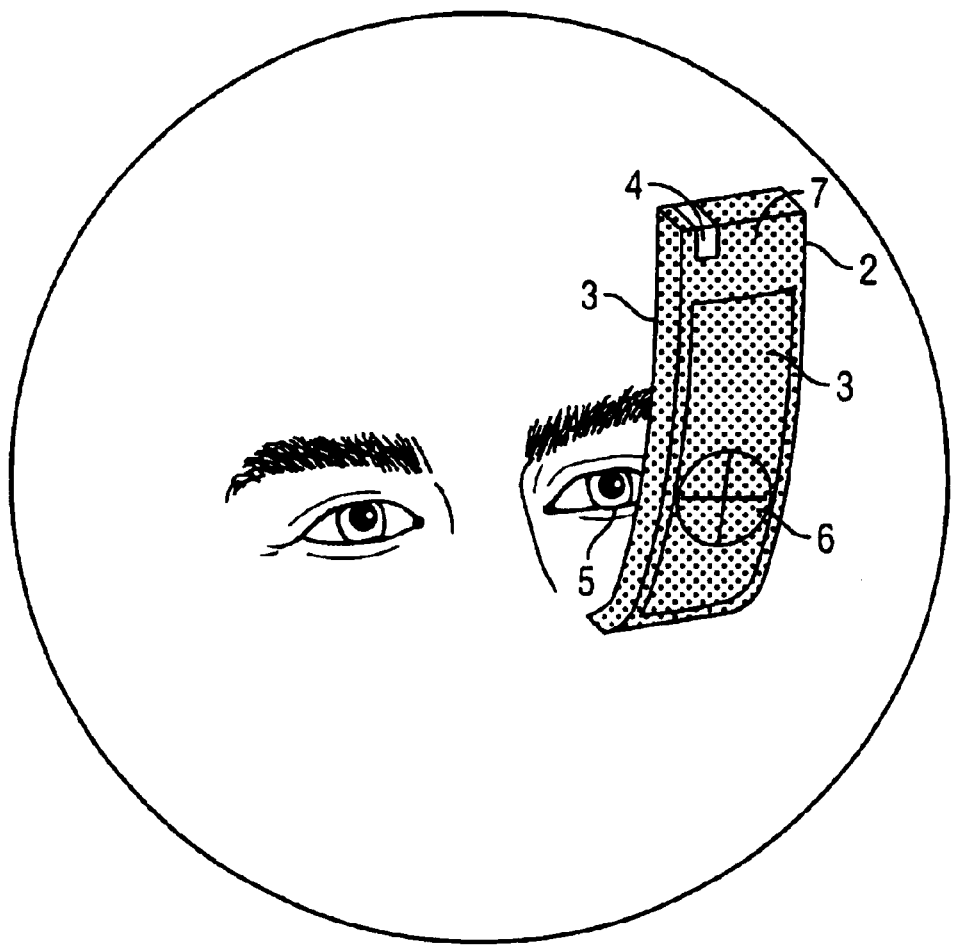
FIG. 2 shows the combiner in front of the line of sight of a user.

FIG. 2 shows the combiner 2 in front of one eye 5 of a user wearing the helmet 1 and an indication of the line of sight 6. A light sensor 4 is used to detect the ambient light. As seen in FIG. 2, the light sensor 4 is placed in the upper portion of the combiner 2 through known bonding methods. However, the light sensor 4 can be placed anywhere to sense the background illumination. Light sensors are well known in this area of technology and will not be discussed in any further detail here. The light sensor output is sent through a lead to combiner control electronics 8 to control the combiner's attenuation.

The electronics 8 have set levels. When a certain level is sensed by the light sensor 4, the electronics 8 attenuate the combiner 2 based on the light sensed. The combiner 2 is placed between two transparent electrically conductive plates 3. The electronics 8 are connected to these plates. When the light sensor 4 detects the light, the sensed light is sent to the electronics 8. In the electronics 8, each level of light has a voltage associated with it. When the level of light is sensed, the voltage affiliated with the light level is applied to the plates which will attenuate the combiner 2 by the voltage applied to it. The level of voltage applied will vary between 0 and a low level voltage (0–2V for example). Zero volts will clear the combiner 2 and increasing voltage attenuates the combiner 2. To maintain the level of attenuation, a low level current is applied to the plates. The control electronics 8 described above is one electronic implementation of the present invention. This implementation is used for example purposes only for the preferred embodiment, but the invention is not limited to this implementation as other implementations can be used as well.

As stated above, the combiner 2 only covers one eye 5 of the helmet user. The other eye retains full adaptation of the bright background scene. The other eye will always keep full adaptation of the background scene as the combiner 2 attenuates more or less based on the brightness of the background ambient illumination. As a result, a contrast will be maintained as the combiner 2 attenuates transmission of light.

Figure 3:
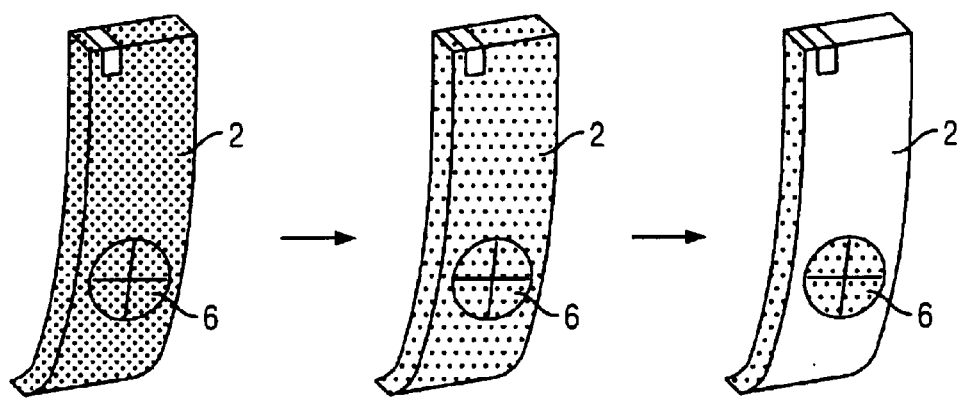
FIG. 3 shows the change in brightness of the combiner as the background ambient conditions change.

FIG. 3 shows the combiner 2, with a line of sight indication 6, as it darkens or attenuates transmission of light. When the background is bright, the combiner 2 is dark and allows a good contrast for ease of viewing of the display image and the external scene. Therefore, for low brightness background ambient conditions, the combiner 2 has little or no attenuation. The attenuation is performed by a coating 7 placed on the combiner 2 which automatically reacts based on the ambient light conditions. As stated above, the light detected is sent to a combiner control electronics 8 which changes the combiner attenuation. Many different materials can be used to provide a thin film coating 7 on the combiner 2 such as LCD film or other known materials.

Figure 4:
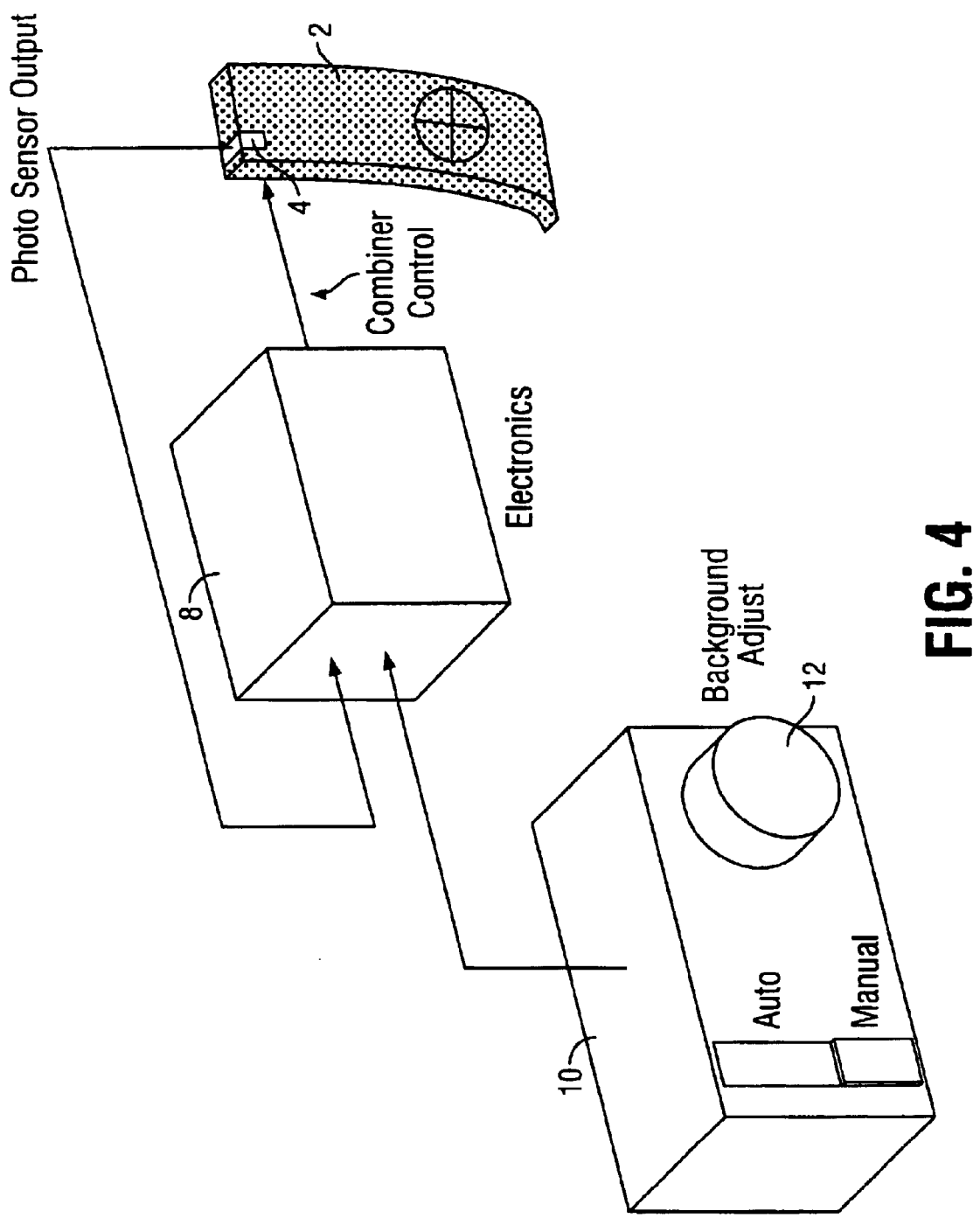
FIG. 4 shows another embodiment of the present invention with manual control of the combiner.

The attenuation of the combiner 2 can also be controlled manually. FIG. 4 shows the system required for manual control of the attenuation of the combiner 2. Instead of having the combiner electronics 8 control automatic changing of the combiner 2, a manual control 10 exists in which the helmet user will select which option, whether automatic or manual, to operate under. A switch could be used, for example, to override the electronics 8 so that it responds to the manual control 10 instead of the light sensor 4. If the manual control is desired by the user, the electronics 8 will operate from the manual control 10. With the selection of the manual control, the helmet user will adjust a knob 12 as to how much the user desires the combiner 2 to be attenuated. This signal is sent to the combiner control electronics 8 which then attenuates the combiner 2 to the desired amount. This is an example of one type of manual control, but many other types of manual control can be used.

The invention has been described herein in detail in order to comply with the Patent Statutes and to provide those skilled in the art with the information needed to apply the novel principles and to construct and use such specialized processes and components as are required. However, it is to be understood that the invention can be carried out by specifically different processes and components, and that various modifications, both as to the processing details and operating procedures, can be accomplished without departing from the scope of the invention itself.

The embodiments of the invention in which an exclusive property or right is claimed are defined as follows:

1. A system for providing a display image from an image source to a user, comprising:
    a combiner configured to be placed in front of only one eve of the user, leaving the other eye of the user with a substantially unobstructed view of ambient background coitions,
    wherein the combiner provides the display image to the user, and
    wherein an LCD film coating is disposed on the combiner to attenuate ambient light passing through the combiner in response to an increase in brightness of the ambient background conditions for Providing a contrast between the combiner and the ambient light conditions; and
    two transparent electrically conductive plates,
    wherein the combiner is placed between the two conductive plates, and
    wherein a voltage is applied across the two conductive plates, thereby causing the ambient light passing through the combiner to be attenuated.

2. The system of claim 1, further comprising a manual control electrically connected to the two conductive plates to enable the user to adjust the voltage, thereby controlling attenuation of the ambient light passing through the combiner.

3. The system of claim 1, further comprising:
    a light sensor for sensing the brightness of the ambient background conditions; and
    combiner control electronics electrically connected to the light sensor and the two conductive plates to control attenuation of the ambient light passing through the combiner based on the brightness of the ambient background conditions.

4. The system of claim 3, further comprising a manual control to enable the user to adjust the voltage, thereby controlling attenuation of the ambient light passing through the combiner.

5. A system for providing a display image from an image source to a user, comprising:
    a combiner configured to be placed in front of only one eye of the user, leaving the other eye of the user with a substantially unobstructed view of ambient background conditions,
    wherein the combiner provides the display image to the user, and
    wherein an LCD film coating is disposed on the combiner to attenuate the ambient light passing through the combiner in response to an increase in brightness of the ambient background conditions for providing a contrast between the combiner and the ambient light conditions, and
    two transparent electrically conductive plates, wherein the combiner is placed between the two conductive plates.

6. A method for providing a display image from an image source to a user, comprising in combination:
    providing a combiner for displaying the image from the image source to only a first eye of the user, a second eye of the user retaining a substantially unobstructed view of ambient background light, wherein the combiner is disposed between two transparent electrically conductive plates, and wherein an LCD film is disposed on the combiner;
    sensing a brightness of ambient background light; and
    applying a voltage to the two conductive plates in response to the brightness sensed by the light sensor to control attenuation of transmission of the ambient background light through the combiner, whereby the attenuated transmission of the ambient background light through the combiner provides a contrast between the combiner and the ambient light conditions.

* * * * *

UNITED STATES PATENT AND TRADEMARK OFFICE
CERTIFICATE OF CORRECTION

PATENT NO. : 6,731,253 B1
DATED : May 4, 2004
INVENTOR(S) : Victor C. Arnold

It is certified that error appears in the above-identified patent and that said Letters Patent is hereby corrected as shown below:

<u>Column 3,</u>
Line 28, the word "eve" should read -- eye --.
Line 30, the word "coitions" should read -- conditions --.
Line 36, the word "Providing" should read -- providing --.

Signed and Sealed this

Thirteenth Day of July, 2004

JON W. DUDAS
*Acting Director of the United States Patent and Trademark Office*